United States Patent [19]

Easter

[11] 4,002,224

[45] Jan. 11, 1977

[54] TURBINE LUBRICATION AND EMERGENCY GAS SYSTEM

[75] Inventor: Michael J. Easter, Aston, Pa.

[73] Assignee: Westinghouse Electric Corporation, Pittsburgh, Pa.

[22] Filed: Feb. 26, 1975

[21] Appl. No.: 553,181

[52] U.S. Cl. .............. 184/6.11; 60/39.08; 184/6.1; 184/6.22
[51] Int. Cl.² .......................... F02C 7/06
[58] Field of Search ........... 184/104 R, 6, 6.28, 184/6.22, 6.11, 6.26, 6.4, 6.1; 60/39.08, 39.36; 415/113

[56] References Cited

UNITED STATES PATENTS

| 3,170,292 | 2/1965 | Howes | 184/6.11 |
|---|---|---|---|
| 3,532,443 | 10/1970 | Johnson | 184/6.11 |
| 3,626,693 | 12/1971 | Guillot | 60/39.28 |
| 3,722,212 | 3/1973 | Stein | 60/39.08 |
| 3,779,345 | 12/1973 | Barnes | 184/6.11 |
| 3,797,561 | 3/1974 | Clark | 60/39.08 |
| 3,844,110 | 10/1974 | Widlansky | 184/6.11 |

Primary Examiner—Paul E. Shapiro
Assistant Examiner—Marvin Siskind
Attorney, Agent, or Firm—F. J. Baehr, Jr.

[57] ABSTRACT

A bearing lubrication system for turbine apparatus. Lubricating fluid stored in a pressurized oil reservoir is pumped by a main oil pump to the bearings. An oil cooler is provided immediately upstream of the pressurized reservoir to lower the temperature of the fluid stored therein and provided to the bearings. Oil returned from the bearings is drained to a nonpressurized oil collection chamber which supplies the suction of the main oil pump. An emergency gas system is included to insure an independent oil flow capacity in the event of interruption in power to, or failure of, the main oil pump.

3 Claims, 5 Drawing Figures

TURBINE LUBRICATION AND EMERGENCY GAS SYSTEM

BACKGROUND OF THE INVENTION

1. Field of the Invention

This invention relates to bearing lubrication systems and, in particular, to lubrication systems having a pressurized oil reservoir and an emergency gas system for backup flow capability.

2. Description of Prior Art

As is well known, a large turbine apparatus converts high-pressure, high temperature energy carried by motive steam into rotational mechanical energy. This transformation is accomplished by permitting the steam to expand through alternating arrays of stationary and rotating blading disposed, respectively, within the turbine casing and on a rotor member extending centrally and axially therethrough. At each axial end of the rotor at a point thereon exterior to the casing is provided a suitable bearing to rotatably support the rotor member. In order to assure that the bearings optimumly perform this function, it is of primary importance that they be supplied with a suitable lubricating fluid. For this purpose, the prior art has disposed elaborate bearing lubricating fluid systems to supply the necessary lubricant to the bearings.

At present, steam turbine lubricating systems utilize an oil pump mounted on the turbine rotor shaft as a device to provide lubricating oil under pressure to the turbine bearings. This shaft-mounted oil pump uses the kinetic energy of the rotor to provide an energy source independent of other interruptible power sources to convey fluid to the bearings. The shaft-mounted main oil pump provides motive oil to an oil ejector, or hydraulic turbine, which is located within a lubricating fluid reservoir. The discharge of the ejector supplies lubricating fluid under pressure to an oil cooler and then to the turbine bearings. A portion of the pressurized fluid at the discharge of the ejector is also supplied to the shaft-mounted pump suction to prime the shaft-mounted pump, i.e., to maintain a supply of fluid thereto.

After serving its lubricating purpose within the bearing member, oil returns to the reservoir by gravity through a suitably disposed oil strainer. The reservoir itself is located a significant distance beneath the centerline of the turbine apparatus which it serves. All of the oil supply lines emanating from the reservoir to the bearings are surrounded by a guard pipe to insure that any leak developed within the fluid lines will drain to the oil reservoir. As a concomitant to this safety requirement, it is apparent that the reservoir itself must be of sufficient size to hold all the run-back of oil of the entire system. Motor-driven pumps are mounted on the reservoir and provide oil to the turbine bearing during those periods when the rotor is moving up to or coming down from rated speed.

Any oil lubricating system, the above-described being typical of a prior art embodiment, must meet the three so-called reliability constraints. To meet these reliability constraints, a lubricating system must, first, provide oil to the bearing with minimal possibility of any interruption of oil supply system pressurization; second, provide oil at a temperature cool enough to be utilized by the bearings; and, third, provide oil to the bearings that is not contaminated by foreign matter. In addition to the reliability constraints just outlined, it is desirable that a lubricating system be efficient so as not to overly detract from the efficiency of the entire power plant. With these requirements in mind, it is apparent that the prior art systems, although meeting the reliability requirements, do so with a minimum regard for the overall efficiency of the lubricating system.

For example, although a shaft-mounted pump is reliable in the sense that flow to the bearings is maintained regardless of pump electric or steam power interruptions, since the fluid reservoir is located a significant distance below the turbine centerline, considerable power from the shaft-mounted pump is required in order to provide the necessary motive power to lift the lubricating fluid from the reservoir to the turbine bearings and also to the shaft-mounted pump suction. On a typical unit, for example, such a turbine shaft-mounted pump requires 800 horsepower in order to provide motive oil for the lubrication functions. As a further disadvantage, if the system utilizes an ejector to pressurize the oil flowing to the bearings, a limited discharge pressure is available due to the very nature of the ejector apparatus. Therefore, there is a limited range of distances that the reservoir may be located from the turbine, thus reducing overall power plant flexibility. Further, the motor driven pumps mounted on the reservoir may themselves require 75 to 100 horsepower to provide fluid to the bearings when they are called upon to do so.

A still further disadvantage in the prior art systems is the high temperature at which fluid is stored in the reservoir. The prior art maintains fluid in the reservoir at the drain temperature of approximately 150° F. In the event of loss of cooling water to the oil coolers located downstream of the reservoir, there is danger of damage to the bearings due to the introduction thereinto of hot oil, in contravention of the second reliability requirement discussed above. Yet another limitation in the efficacy of prior art lubrication systems is the inability to effectively eliminate foreign contaminants from the fluid before the fluid leaves the reservoir. Also, the physical size of the conduits required by prior art systems occupies a greater portion of power plant area than is economical, thus directly increasing the cost of these facilities.

It is apparent that an improved lubricating fluid system for the bearing of a turbine apparatus which eliminates these aforementioned problems of the prior art is required.

SUMMARY OF THE INVENTION

This invention discloses a novel, useful and unobvious lubricating system which satisfies all of the generally recognized reliability constraints in a manner that is more efficient than and overcomes all of the aforementioned disadvantages of the prior art.

The lubricating system comprises a lubricating fluid reservoir having therein a pressurized storage and a nonpressurized drain section. Suitable pumpings means, such as an electrically driven pump, is mounted on the reservoir and pumps fluid from the nonpressurized drain section, through an oil cooler, and into the pressurized section and to the bearings. Fluid discharged from the bearings is collected in the nonpressurized drain and provides fluid to satisfy the pump suction. Provision of the cooler immediately upstream of the pressurized section maintains oil in storage at a cooler temperature than in the prior art.

An emergency gas backup system is provided to maintain bearing oil flow in the event of a system malfunction. The emergency gas system utilizes an external pressurized gas supply and provides pressure to maintain lubricant flow upon activation by a suitable mechanical control arrangement. An alternative emergency gas supply is disposed on the interior of the lubricating reservoir to provide oil flow. In this embodiment, the gas and lubricating fluid are maintained isolated along a fluid-gas interface within a separate section within the reservoir.

It is an object of this invention to provide a lubrication system for a bearing for a turbine apparatus which meets all of the reliability constraints of prior art systems in a more efficient manner. It is a further object to provide a pressurized oil reservoir downstream of an oil cooler to maintain the lubricating fluid at a temperature lower than the storage pressure or prior art systems. It is yet a further object of this invention to provide an emergency backup system to provide lubricating fluid in the event of system malfunction. It is a still further object to provide an emergency system utilizing an external gas supply having a mechanical control arrangement associated therewith. Alternatively, it is an object of this invention to provide an emergency gas supply internal of the lubricating fluid reservoir and exhibiting a fluid-gas interface therewithin.

Other objects of the invention will become apparent in the detailed description of the invention which follows herein.

BRIEF DESCRIPTION OF THE DRAWINGS

The invention will be more fully understood from the following detailed description, taken in connection with the accompanying drawings, in which.

DESCRIPTION OF THE PREFERRED EMBODIMENTS

Figure 1:
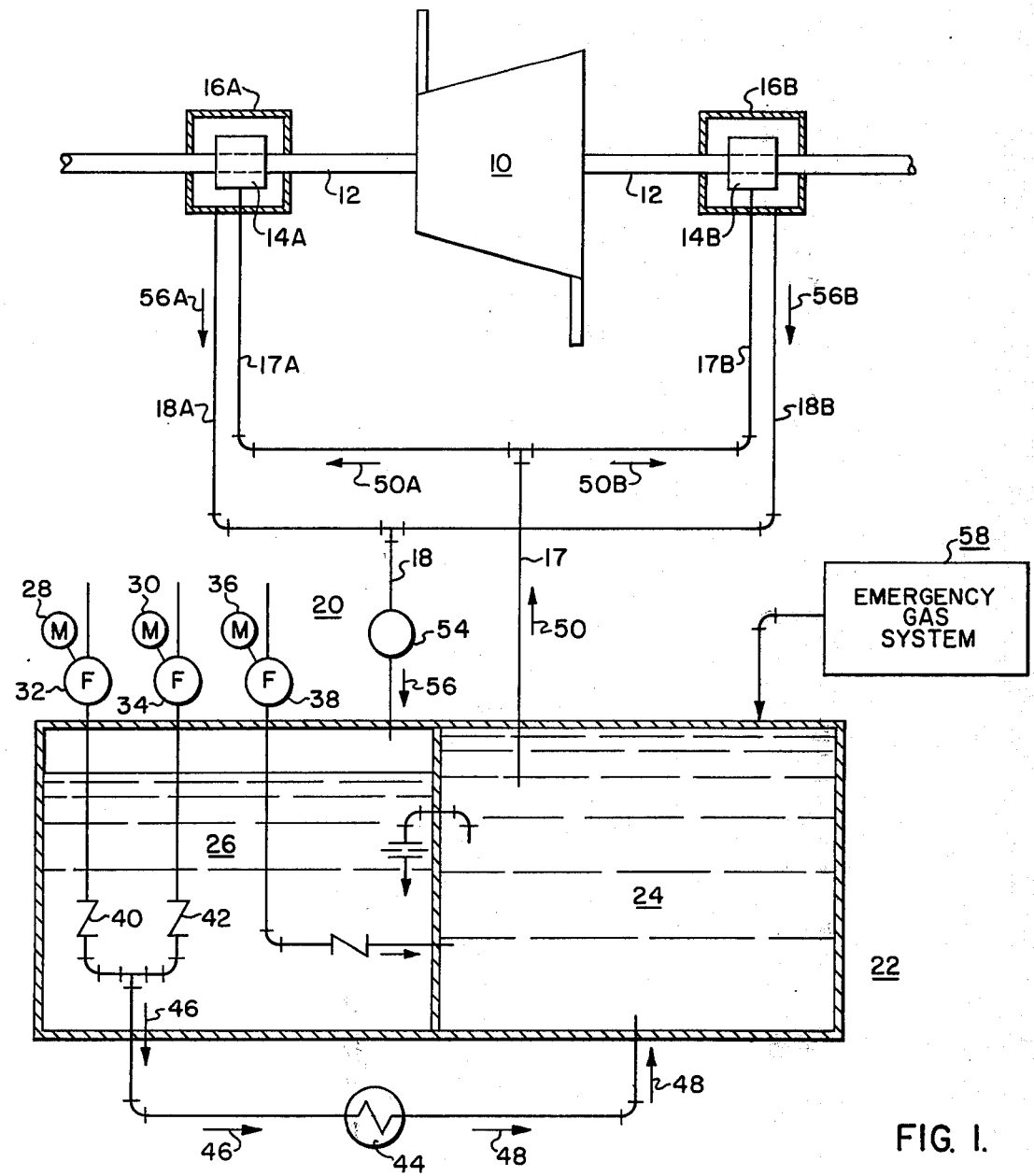
FIG. 1 is a schematic view of a turbine bearing lubrication system embodying the teachings of this invention.

Throughout the following description, similar reference numerals refer to similar elements in all figures of the drawings.

Referring first to FIG. 1, a schematic view illustrating a lubrication system for the bearings of a large turbine apparatus is shown. As seen from the figure, a turbine 10 has a shaft 12 disposed centrally and axially therethrough. The shaft 12 is supported at each axial end thereof by bearing members diagrammatically illustrated at 14A and 14B. Each of the bearings 14A and 14B is supported within a suitable bearing housing, 16A and 16B, which are connected to inlet conduits 17, 17A and 17B, and discharge conduits 18, 18A and 18B, all of which are associated with the lubrication system 20 which embodies the teachings of this invention.

The lubrication system 20 embodying the teachings of this invention meets, in a manner to be more fully explained herein, each of the reliability constraints imposed by the steam turbine power generation art on lubrication systems in a manner that is more efficient than that exhibited by the prior art. Of course, as is known to those skilled in the art, to meet the reliability constraints, a lubrication system should: first, minimize the possibility of loss of lubricating fluid to the bearings under any operating condition regardless of failure of any system component or during any emergency condition; second, provide lubricating fluid at a temperature cool enough to prevent damage to the bearings thereby; and third, provide lubricating fluid to the bearings that is not contaminated by foreign particles which may deleteriously affect the bearing.

The system 20 shown in FIG. 1 includes a lubricating fluid reservoir 22 having a pressurized section 24 and a nonpressurized section 26 therein. Mounted on the reservoir 22 above the nonpressurized section 26 are A.C. motors 28 and 30 which, respectively, provide A.C. power for lubricating fluid pumps 32 and 34. For convenience, the pump 32 is designated as the main oil pump while the pump 34 is the auxiliary A.C. pump. In addition, a D.C. motor 36 associated with a standby pump 38 may be provided, if desired.

Oil, or other suitable lubricating fluid disposed within the nonpressurized section 26, is, during normal operation, pumped by either the main oil pump 32 or auxiliary pump 34 through valving 40 or 42, depending upon whether the main pump 32 or auxiliary pump 34 is being operated, from the nonpressurized section 26 into an oil cooler 44, the flow being illustrated by reference arrows 46. Throughout the following discussion, it will be assumed that the main oil pump 32 is operative. It is understood that the auxiliary A.C. pump 34 is structurally similar in all respects to the main oil pump 32. Within the cooler 44, oil temperature is lowered to a predetermined level, being optimally stored at approximately 120° F. From the cooler 44, the oil is pumped under pressure, as illustrated by reference arrow 48, into the pressurized section 24. The pressurized section 24 acts as a pressurized source of fluid for the bearings 14A and 14B, lubricating fluid moving to the bearings 14A and 14B within conduits 17, 17A and 17B from the pressurized reservoir 24 in accordance with flow arrows 50, 50A and 50B. The fluid stored within the pressurized section 24 is maintained at a predetermined pressure of approximately 40 p.s.i. due to the pump 32 during normal system operation. The fluid supplied from the pressurized section 24 enters the bearings at approximately 15 p.s.i., due to pressure drops within the conduits 17, 17A and 17B. It is understood that the numerical values herein given are typical examples only, and that the precise operating pressure and temperature of the fluid stored within the pressurized section 24 is functionally dependent upon a variety of system parameters. Once given these parameters, of course, one skilled in the art may expeditiously arrive at the predetermined temperature and pressure values.

Fluid discharged from the bearings 14A and 14B returns through the conduits 18, 18A and 18B and through a strainer 54 in accordance with flow arrows 56, 56A and 56B and into the nonpressurized section 26. Oil drained by gravity into the nonpressurized section 26 fills the suction of the main oil pump 32 to complete the lubricating fluid flow path.

As may be appreciated from the foregoing, the system 20 above-described overcomes several of the disadvantages associated with the prior art. Since the pumps 32 and 34 are mounted on the reservoir 22, less energy is required to provide lubricating fluid for the pump suctions than in the prior. In the prior art utilizing a turbine shaft-mounted pump, energy is required to both lift oil to the bearings and also to lift oil from the reservoir to supply the shaft-mounted pump suction. With the system embodying the teachings of this invention, however, energy is expended only to lift oil from the reservoir to the bearings, thus making the system described herein more efficient than the prior art. And, since the main and auxiliary pumps 32 and 34 are both A.C. motor driven, a further increase in efficiency is derived over the relatively inefficient shaft-mounted pump used in the prior art.

As stated earlier, due to the disposition of the pressurized storage section 24 downstream relative to the oil cooler element 44, lubricating fluid is stored within the pressurized storage section at approximately 120° F. The prior art, which locates the single section, unpressurized oil storage reservoir upstream of the cooler, stores oil at approximately bearing drain temperature, or 150° F. This difference in storage temperature between the system disclosed herein and the prior art directly relates to the second reliability restraint, in that the oil is supplied to the bearings at a suitable temperature under all operating conditions. Storing of lubricating fluid at the lower temperature has an advantage in that it provides a useful heat sink in the event of damage or malfunction of the oil coolant system.

In the prior art, assuming that lubricating fluid is stored at bearing drain temperature of 150° F and that the cooler is located downstream of the reservoir, failure of the cooler results in the likelihood of the following situation. With fluid stored at 150° F, and no cooling capability, fluid is supplied to the bearings at that temperature. Fluid is thus discharged from the bearings at approximately 180° F. This fluid then drains to the reservoir and raises the overall temperature therein to approximately 165° F. Fluid at 165° F. is then introduced into the bearings and discharged therefrom at 195° F. This fluid returns to the reservoir and raises the temperature therein even more, to approximately 175° F. The cycle thusly, and although the temperatures cited are only approximations, the result is clear — the prior art systems will, in event of cooler failure, supply fluid to the bearings at increasingly higher and higher temperatures, in contravention of the second reliability constraint.

However, compare with the system embodying the teachings of this invention. Fluid is stored in the pressurized storage section 24, located downstream of the cooler 44, at approximately 120° F. In the event of cooler failure, fluid at the temperture of 120° F passes to the bearings 14A and 14B and is discharged therefrom at 150° F. This fluid enters the storage section 24 and mixes with fluid still at 120° F. to raise the temperature of the lubricating fluid therein to approximately 135° F. The fluid at 135° F. is introduced to the bearings and is discharged therefrom at 165° F. This discharge returns to the storage section 24, mixes with fluid at 135° F. and raises the temperature to approximately 145° F. Again, although the temperatures are approximate, the result is clear — the pressurized storage section 24 downstream of the cooler 44 acts as a heat sink to maintain lubricating fluid temperature lower than the prior art during cooler malfunction, thus admirably effectuating the second reliability constraint. This means that cooler oil is available for a much longer time than in present systems wherein the oil is stored in the reservoir is at the system drain temperature.

With the lubrication system taught herein, limitations as to system flexibility attendant upon the ejector systems of the prior art are eliminated due to reservoir location, size and pumping capability. Increased cost savings are permitted since overall construction of the reservoir is simplified and also since the system requires significantly less material and hardware than the prior art. Heat rejection losses in the system are reduced over the prior art by elimination of turbine-shaft driven pumps. This reduction of heat rejection losses permits a reduction in system operating cost, while at the same time increasing system output. It may thus be appreciated that a lubrication system embodying the elements taught by this invention provides a novel, useful and unobvious departure over prior art lubrication systems.

Figure 2:
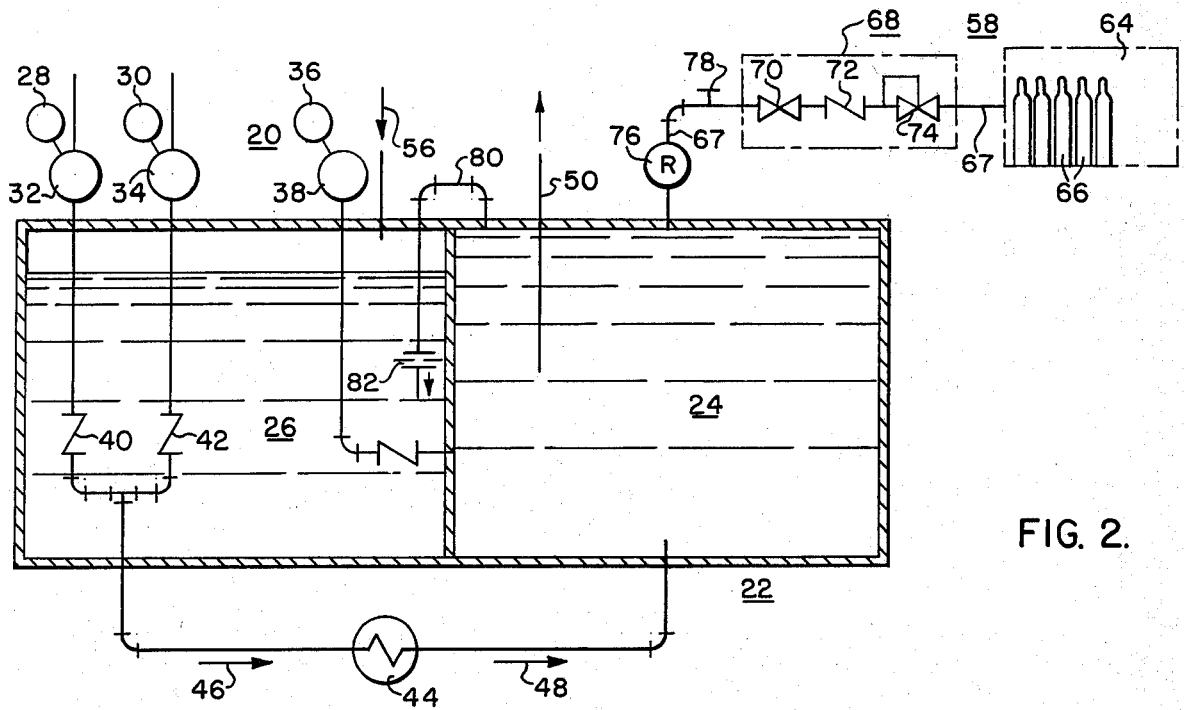
FIGS. 2 and 3 are schematic views of lubrication systems employing emergency gas systems to maintain oil flow according to the teachings of this invention; and, FIGS. 4 and 5 are schematic views of a hypothetical turbine lubrication system embodying the teachings of this invention.
Figure 3:
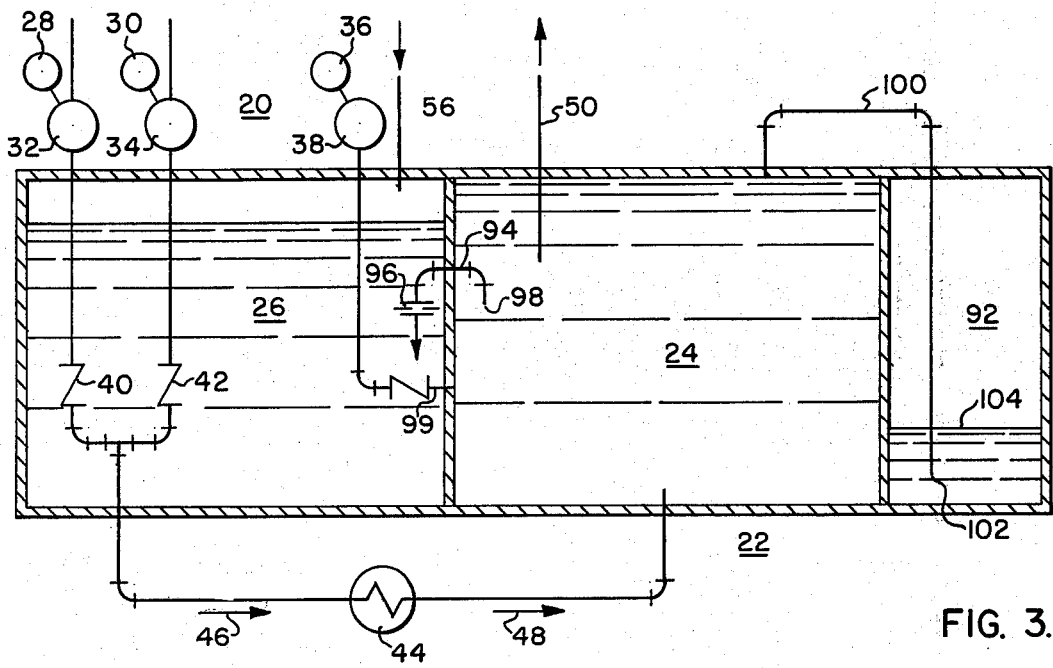

As an added feature to insure a reliable continuous flow of lubricating fluid to the bearings during any emergency condition, an emergency gas system 58 is cooperatively associated with the above-described elements of the lubrication system 20. FIGS. 2 and 3 illustrate alternative embodiments of an external and internal gas emergency backup system embodying the teachings of this invention.

Referring now to FIG. 2, a more detailed schematic view of a lubrication system 20 employing an emergency gas system 58 is shown. As seen from FIG. 2, and utilizing elements described fully in FIG. 1, the lubricating system 20 includes the reservoir 22 which comprises both the pressurized compartment 24 upstream of the oil cooler 44 and the nonpressurized drain section 26. From the pressurized section 24 lubricating oil under pressure is pumped directly to bearings 14A and 14B, as described in FIG. 1. Lubricating oil drained by the gravity from the bearings 14A and 14B is conducted to the nonpressurized drain section 26 to supply the suction for either the primary A.C. pump 32.

The emergency gas system 58 comprises a high pressure gas storage volume 64 disposed external to the reservoir 22. The volume 64 acts as a source of high pressure gas for use in maintaining lubricating fluid flow to the bearings in the event of pump power interruption. Any suitable gas source may be utilized, as illustrated by the array 66 of gas cylinders. A conduit 67 is provided between the high pressure gas source 64 and the pressurized section 24.

Disposed within the conduit 67 intermediate between the gas source 64 and the reservoir 22 is means 68 for controlling the introduction of the high pressure gas from the source 64 into the pressurized section 24. Although any arrangement which will functionally control the high pressure gas flow in a manner to be explained more fully herein is suitable for use as the control means 66, the embodiment shown in FIG. 2 disposes, within the conduit 67, a shut-off valve 70 connected in series to a one-way check valve 72 and a pressure regulator 74. Also provided in the conduit 67 is a separate relief valve 76 and a blow-out disc 78, which serve to protect the reservoir 22 from overpressurization. All of the above-mentioned valves are normally in a seated, or closed, position, with the exception of the shut-off 70 which is normally open.

In operation, on initial starting of the system, lubricating fluid is pumped by the main oil pump 32, through its associated control valve 40 from the nonpressurized storage section 24. As explained in connection with FIG. 1, the temperature of the fluid is lowered to its predetermined storage temperature of approximately 120° F. by the oil cooler 44 disposed upstream of the pressurized storage section 24. As the level of oil rises within the pressurized section 24, air, which is trapped and compressed within the pressurized section 24 as the fluid is introduced therein and which would offer opposition to the continued introduction of lubricating fluid, is vented from the pressurized section 24 through a suitably provided vent 80. The vent line 80 has an orifice 82 therein, and extends from the pressurized section 24 into the nonpressurized section 26.

As the lubricating fluid fills the entire pressurized section 24, some leakage through the ventline 80 and the orifice 82 occurs. However, the orifice 82 is sized such that leakage of fluid from the pressurized section 24 is of a magnitude that does not permit depressurization of the fluid within the pressurized section 24.

As explained in FIG. 1, the lubricating fluid is stored within the pressurized section 24 at approximately 40 p.s.i., and is pumped to the bearings at 15–20 p.s.i. to supply the lubrication requirements thereof. Throughout the normal operating cycle, the flow of fluid to the bearings passes as described. However, if any interruption of pump power 32 occurs, a system meeting the first reliability constraint is provided for the continued flow of lubricant.

In general, if malfunction of the main oil pump 32 occurs, the auxiliary pump 34 stands ready to maintain oil flow to the bearings. And, if A.C. power to both these pumps is interrupted, there is available the D.C. pump 38. Even though the reliability of such back-up power supplies is good, there is required some finite time interval between the failure of A.C. power and the restoration of flow by D.C. powered-pumps. A severe problem is generated, however, due to the flow requirements for the turbo-machinery utilized in modern power generating facilities. To provide the lubricating fluid flow required for the turbo-machinery for even the matter of seconds needed to initiate D.C. power is a difficult task. The emergency gas system 58 embodying the teachings of this invention maintains lubricating fluid flow to the bearings, thus preventing flow interruption in the event of loss of pump power.

The emergency gas system 58 shown in FIG. 2 operates as follows: The regulator 74 is preset at some predetermined value, commonly some pressure value a predetermined amount below the storage pressure. As an example, if the storage pressure is 40 p.s.i., the regulator is set at 35 p.s.i. The nature of a regulator 74 is such that once the regulator is set to a specific pressure value, it will permit passage of fluid through it to maintain that preset pressure value downstream thereof.

Applied to FIG. 2, with the regulator 74 set at 35 p.s.i., it is assured that sufficient gas flow will be permitted to pass through the regulator 74 to maintain 35 p.s.i. at all points downstream of the regulator 74. During normal system operation, of course, no high pressure gas flow is permitted through the regulator 74, since the lubricating fluid pressure within the pressurized section 24 is maintained by the pump 32 at 40 p.s.i. But, when A.C. power fails, the pressure within the lubricating fluid drops. If the pressure of the lubricating fluid drops below 35 p.s.i., the regulator permits as much high pressure gas flow from the source 64 to flow through valving 70 and 72 as is necessary to maintain the preset level of 35 p.s.i. The shutoff valve 70 is seated during maintenance periods, while the check valve 72 prevents flow of lubricating fluid from the storage reservoir 24 to the source 64 in the event of depressurization of the source 64.

Of course, the introduction of high pressure gas into the pressurized section 24 exerts a force on the lubricating fluid therewithin to move that fluid to the bearings. Thus, lubricating fluid flow is maintained even in the event of A.C. pump power interruption. The high pressure gas source may be sized to accommodate whatever volume of gas is necessary, as determined by system planners. At the ultimate, enough high pressure gas may be stored as will be necessary to exert a force for such a period of time as will completely empty the storage section 24. In this manner, the high pressure gas stored in the high pressure gas source 64 is permitted to flow into the pressurized section 24 to maintain sufficient pressure therein to continue oil flow until backup pumping means is restarted.

It is seen that through the control arrangement 68, a regulated source of high-pressure gas is introduced into the volume 62 above the upper level 60 of the lubricating fluid within the pressurized section 24 in order to insure that a continuous flow of lubricating fluid is provided to the bearings 14A and 14B in the event of pump pressurization interruption. Therefore, even a loss of pumping pressure from the main oil pump 32 will not cause an interruption of oil flow to the bearings due to the emergency gas system 58 in accordance with the first reliability constraint. Upon startup of the normal pumping functions, the gas permitted into the storage section 24 is purged in a manner similar to the initial startup procedures.

Referring now to FIG. 3, a schematic view of a lubrication system 20 showing another embodiment of the emergency gas system 58 taught by the invention is illustrated. It will be observed from examination of FIG. 3, that the reservoir 22 is divided into three separate compartments: the pressurized section 24, the nonpressurized drain section 26, and a pressurized gas storage section 92. The volumetric capacities of the respective sections of the reservoir are readily determinable once an understanding of the functions each section performs in the context of meeting the lubrication needs of an on-line turbine generating station. These functions are, of course, defined fully herein.

In a manner similar to the previous drawing figures, lubricating fluid is pumped by the pump 32 to the bearings 14A and 14B from the pressurized section 24 located immediately downstream of the coolers 44. Oil is drained by gravity from the bearings 14A and 14B to the nonpressurized drain 26 where it fills the suctions of the main oil pump 32 and the auxiliary pump 34. A vent line 94 having an orifice 96 therein is disposed between the pressurized section 24 and the nonpressurized section 26 at a predetermined level 98 within the pressurized section 24. An equilibrium conduit 100 is provided between the pressurized section 24 and the integral gas storage section 92, the conduit 100 terminating at a predetermined level 102 within the gas storage section 92.

The initial filling of the oil reservoir 22 is accomplished by introducing oil into the nonpressurized section 26. Oil enters the storage section 24 from the nonpressurized drain section 26 either through a conduit 99 associated with the D.C. backup pump 38 or through the cooler 44 and its associated conduits. As the reservoir 22 fills with oil, the oil level in both the nonpressurized section 26 and the storage section 24 will rise. When the oil level in the storage section 24 reaches the vent 94, the rising oil level traps a volume, or pocket of gas, usually air, above the vent level 98, the volume of gas trapped being functionally related to the location of the vent level 98 in the storage section 24.

As more oil continues to pour into the nonpressurized section 26, the oil level continues to rise therein until the nonpressurized section 26 is completely filled. After the oil level in the storage section 24 reaches the vent level 98, the oil level therein rises only slightly with the compression of the gas volume thereabove, even though the nonpressurized section 26 has been completely filled.

When the nonpressurized section 26 is completely filled, the main oil pump 32 is started, and oil is pumped from the nonpressurized section 26 to the pressurized storage section 24. The pressure of the oil within the pressurized storage section 24 is increased and the trapped gas volume is compressed into the gas storage section 92 through the equilibrium conduit 100. As the pressure in the pressurized storage section 24 rises, oil begins to flow through the conduits 50 to the bearings.

When the pump 32 has established designed flow, that is, when the flow due to the pump 32 from the nonpressurized section 26 to the pressurized storage section 24 equals the flow from the pressurized storage section 24 to the bearings, the pressure within the pressurized section 24 is sufficient to have compressed the volume of trapped gas completely into the gas storage section 92 with sufficient oil overflow volume to fill section 92 above the level 102 of the conduit 100.

As design flow is reached, pressure equilibrium is established. Since the pressure in the gas storage section 92 is equal to the pressure in the pressurized storage section 24, there is no oil flow in the equilibrium conduit 100 and the oil in the gas storage section 92 is static along an oil-to-air interface 104. The static oil-to-air interface 104 prevents dissolution of air into the oil.

When an interruption in pump pressurization occurs, the pressure of the lubricating fluid in the pressurized section 24 decreases. The trapped air within the pressurized air section 92 expands, maintaining oil flow with decreasing pressure. Thus, a flow of pressurized air from the pressurized air section 92, through the equilibrium pipe 100 and into the pressurized fluid section 24 occurs. The pressurized air exerts a force on the oil remaining in the storage section 92 to insure that the flow of lubricating fluid to the bearings is continued. The pressure of the trapped air will maintain flow at decreasing pressure for sufficient time to permit the startup of the backup flow. Upon startup of the backup flow, either pump 34 or 38, the pressurized storage section 24 is again pressurized and the entrapped air pocket again compressed within the gas storage section 92, as discussed earlier.

As an example, the method of computation of the critical volumetric relationships in a hypothetical turbine lubrication system will be presented. It is to be understood that the computations herein given are presented in an illustrative manner and not in any limiting sense whatsoever. The sole purpose is to present the analytical approach utilized in ascertaining certain volumetric relationships for various portions of a system embodying the teachings of this invention for the hypothetical turbine lubrication system described. It is to be understood that the principles discussed have universal application to any particular lubrication system embodying the teachings of this invention.

Figure 4:
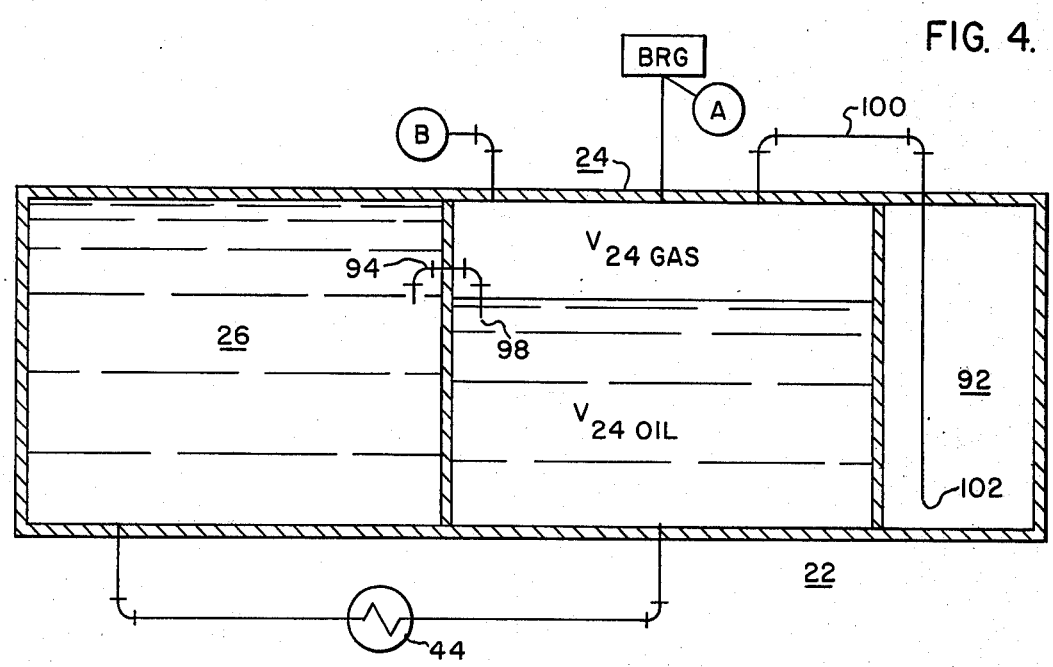
Figure 5:
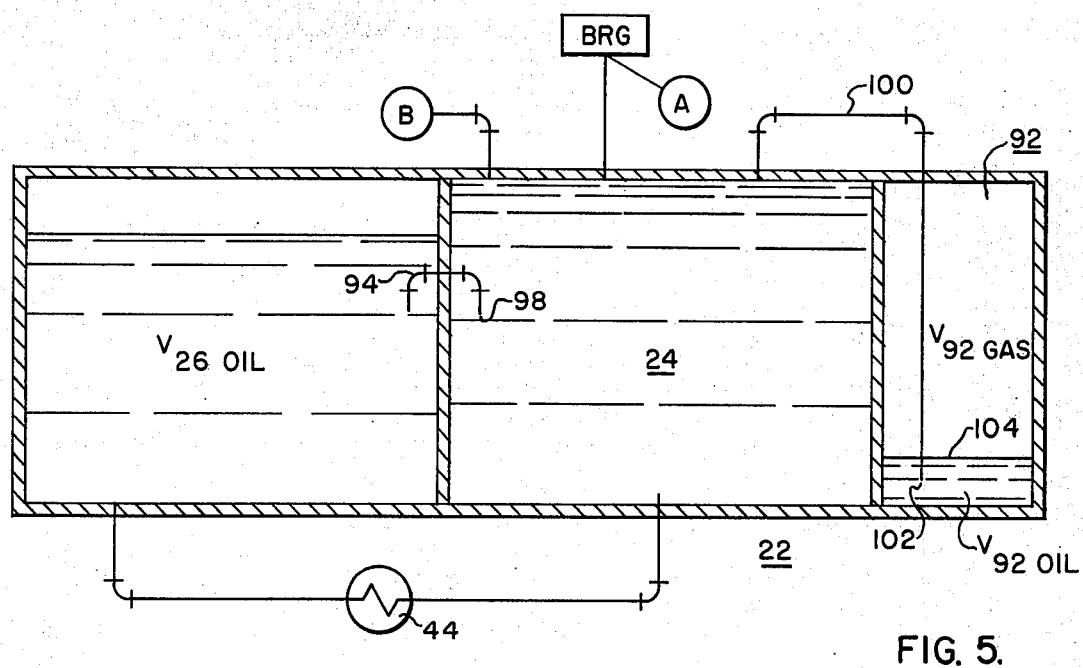

For ease of discussion, reference will periodically be directed to FIGS. 4 and 5, which, respectively, illustrate the lubrication system as charged fully prior to pump actuation and which illustrate the equilibrium state where design flow is initiated to the bearings.

The hypothetical turbine system parameters necessary to illustrate the operative principles are now defined. It is assumed that for a 10 minute fluid dwell time the system will utilize a 5000 gallon reservoir 22. The oil flow rate is 500 gallons per minute, with a pressure of 15 p.s.i., as measured by the gauge A at the bearings. There is a 10 p.s.i.g. elevation head between the bearings and gauge A, and the pressurized storage section 24 having a gauge B. Also, a 5 p.s.i.g. frictional pressure drop between gauges A and B is developed when rated oil flow passes from the pressurized storage section 24 to the bearings. System requirements are such that a volume of 2500 gallons is chosen as the heat sink volume within the pressurized storage section 24 during equilibrium, and that 1000 gallons are in transit between drain and supply during operation. It has been defined that 20 gallon overflow is extant in the gas section 92 to cover the pipe level 102 therein during operation. The bearing oil flow rate is assumed to be directly proportional to the pressure.

It is required that such a hypothetical system be provided with a 30 second oil flow by a lubrication system embodying this invention. That is, in the event of an interruption in pump pressurization, the emergency gas system must provide flow for 30 seconds before bearing pressure (at gauge A) decay from 15 p.s.i.g. to 0 p.s.i.g.

It is necessary to ascertain, with the above hypothetical requirements, the volume of oil which must be pumped by the emergency gas system to meet the bearing oil needs in the event of pump pressurization interruption. It may be shown that, for the system described, the volume of oil pumped in 30 seconds at an initial flow rate of 500 gallons per minute at 15 p.s.i.g. and a final flow rate of 0 gallons per minute at 0 p.s.i.g. is 125 gallons.

The relationship between the bearing oil pressure at gauge A and the storage pressure at gauge B is also determined. It can be shown that, for the system described, when the bearing pressure at gauge A equals rated pressure of 15 p.s.i.g., the storage pressure at gauge B equals the sum of rated bearing pressure, elevation head, and friction drop, or 30 p.s.i.g. Since section 24 is connected by the equilibrium conduit 100, the pressure in the gas storage section is also 30 p.s.i.g. When the bearing oil pressure is 0 p.s.i.g. at gauge A, the pressure in the storage section 24 at gauge B is 10 p.s.i.g. Thus, the gas storage section 92 must contain a gas volume such that expansion from 30 p.s.i.g. to 10 p.s.i.g. equals an increase in volume of 125 gallons.

Assuming temperature constant and the internal volume of the conduit 100 to be negligible, application of the Perfect Gas Law will make possible the calculation of the volume of the gas storage section 92. As seen from FIG. 5, the volume of section 92 equals the volume of oil plus the volume of gas therein; symbolically, $$V_{92} = V_{92\ oil} + V_{92\ gas} \qquad 1.$$

The volume of gas in section 92 is ascertained by the simultaneous solution of the relationships obtained from the Perfect Gas Law and from the system definition. From the definition, the volume of oil, $V_{92\,oil}$, is 20 gallons. The Gas Law states that the pressures and volumes of an initial and final state are related by, $$V_i P_i = V_f P_f \qquad 2.$$

The initial pressure being 30 p.s.i.g.; the final pressure being 10 p.s.i.g. From the system definition, it may be said $$V_f - V_i = 125 \qquad 3.$$

Solving equations (2) and (3) simultaneously for $V_i$ yields 155 gallons. Thus, in equation (1), the volume of gas in section 92, $V_{92\,gas}$ plus the oil volume, $V_{92\,oil}$, yields a volume of section 92 of 175 gallons.

The volume of gas trapped in the pressurized section 24 above the level 98 of the vent 94, ($V_{24\,gas}$ in FIG. 4) must also be determined. That is, the location of the vent 94 must be determined so as to entrap within the remainder of the sections 24 and section 92 a volume of gas which will expand from an initial state of 30 p.s.i.g. and 155 gallons to a final pressure of 1 atmosphere. From the Perfect Gas Law, it is determined that this volume be 470 gallons. Thus, the volume of gas above the oil vent level 94 is the difference betweeen the total volume trapped (470 gallons) and the volume of the gas section 92 (175 gallons), or $V_{24\,gas}$ equals 295 gallons.

Thus, the vent level 98 must be located such that when the system is charged (FIG. 4), there is trapped in the pressurized storage section 24 above the oil level 295 gallons of gas. The volume of oil in storage section 24 is determinable since the system requires a total heat sink of 2500 gallons, and since 295 is trapped gas, the volume $V_{24\,oil}$ (FIG. 4) is 2205 gallons.

The volume of the nonpressurized section 26 is obtained by adding the remaining volume of oil necessary to hold the entire charge during operation (i.e., 2500 gallons, since in operation there is 2500 gallons in section 24 and since the system requires 5000 gallons); plus the amount of oil in transit (from the definition, 1000 gallons); plus the amount of oil necessary to completely fill the section 24 after initial charging (295 gallons); and plus the overflow volume in section 92 (20 gallons).

It may thus be appreciated that for the hypothetical example given for illustrative purposes only, once the functions and operation of the various sections 24, 26 and 92 of the reservoir 22 are known, one skilled in the art and applying well-known analytical techniques may expeditiously calculate the volumetric relationships between the reservoir sections.

It may be readily appreciated from inspection of FIG. 3 and comparison therewith to FIG. 2 that the emergency gas system provided in FIG. 3 includes no moving parts and does not rely on mechanical reliability of the control system as does the embodiment shown in FIG. 2. Also, the provision in FIG. 3 of the pressurized gas section 92 as an integral portion of the reservoir 22 provides an internal emergency gas system as compared with the external emergency gas system shown in FIG. 2. Note, however, that the emergency gas supply of the FIG. 2 embodiment is greater than the embodiment of FIG. 3, thus permitting a longer period of emergency gas flow to maintain lubricating oil to the bearings. Thus, either embodiment of the invention may be utilized to provide a continuous flow of pressurized fluid to the bearings by the introduction into the pressurized storage section 24 of a pressurized gas from an emergency gas source. The power generating utility is offered a wide range of flexibility as to whether an internal or external system is utilized, while both systems admirably provide the backup flow capability. However, it is to be emphasized whatever embodiment of emergency gas system is chosen, the utilization therewith of a pressurized storage volume of lubricating fluid disposed downstream of the oil cooler provides the advantages discussed in connection with FIG. 1.

Although two embodiments of the emergency gas system 58 have been presented herein, it is, of course, understood that other arrangements of elememts providing the functionally equivalent to the embodiments described are within the contemplation of this invention.

A lubrication system embodying the teachings of this invention, in addition to dependably providing cool oil to the bearings to meet the first and second reliability constraints, as discussed above, adequately provides a contaminant trapping function to meet the third reliability constraint. Of course, the settling ability of contaminant particles is a function of both the velocity and viscosity of the fluid carrying the particle. In the system embodying the teachings of this invention, it is noted that pressurized fluid storage section 24 is disposed upstream of the oil cooler 44. Thus, lubricant stored therein is at a lower temperature, and therefore at a higher viscosity. Further, the system embodying the pressurized storage section 24 exhibits a greater flow area than is available in the prior art storage reservoir. Consequently, the velocity of fluid entering the pressurized storage section 24 is reduced to a greater extent than is possible in the prior art.

The combination of the reduced fluid velocity and increased viscosity result in a lesser Reynolds number for the lubricant flow than in the prior art. As is well known, as the Reynolds number for the flow drops below a critical value, a streamlined flow pattern is created, which enhances the ability of contaminant particles to settle from the flow.

Over and above the reduction of Reynolds number due to the reduction of flow velocity and increased viscosity, utilization of the reservoir 22 having separate pressurized and nonpressurized sections 24 and 26, respectively, eliminate suction turbulence of the prior art. Since the prior art uses only a single chambered reservoir, ejectors or pumps are disposed along the base of the reservoir and suctions created thereby pull any settled contaminants thereinto and transport them directly to the bearings. However, by separating the reservoir into separate sections, suction turbulence generated in the nonpressurized drain section 26 by the pumps therein disposed have no effect on the particles settling from the fluid in the pressurized fluid section 24. Thus, the particles are not pumped directly to the bearings as in the prior art. And, even further, the lubricating fluid flow to the bearings from the discharge of the pressurized section 24 may be manifolded to further reduce the possibility of foreign particles being conducted to the bearings.

It may be appreciated from the foregoing description that a lubrication system embodying the features taught herein meets all of the reliability constraints required by the power generating industry in a manner that is inherently superior and more efficient than any prior art system. Oil flow to the turbine bearings is reliably maintained during pump interruptions due to the provision of either an internal or external emergency gas system. Oil is provided at at temperature cool enough for bearing use and free of harmful contaminants. Storage of oil at the bearing delivery temperature downstream of the cooler element within a pressurized storage section increases the ability of the system to withstand interruption of cooler medium flow.

While preferred embodiments of the invention have been described herein, changes may be made thereto without departing from the spirit of the invention as defined in the appended claims.

I claim:

1. A lubrication system for providing lubricating fluid to a turbine apparatus comprising:
   a lubricating fluid reservoir tank having a pressurized storage section and a nonpressurized collection section therein, said pressurized storage section having said lubricating fluid disposed therein at a predetermined pressure and at a predetermined temperature,
   means for pumping said lubricating fluid from said storage section to said turbine,
   means for conducting lubricating fluid discharged from said turbine to said nonpressurized collection section,
   a cooler element disposed external to said reservoir tank for lowering the temperature of said lubricating fluid to said predetermined temperature, said lubricating fluid passing from said collection chamber through said cooler element and into said pressurized storage section as said lubricating fluid is pumped to said turbine from said storage section, and,
   an emergency gas system for maintaining a flow of pressurized lubricating fluid to said turbine in the event of cessation of operation of said pumping means, said emergency gas system including
   a gas storage section integral with said reservoir tank, said gas storage section having a predetermined quantity of gas having a predetermined pressure disposed therewithin,
   a conduit connecting said gas storage section with said pressurized storage section,
   said predetermined pressure of said lubricating fluid being greater than said pressure within said stored gas when said pump means is operable, said lubricating fluid at said predetermined pressure maintaining said gas entirely within said gas storage section when said pump means is operable,
   said pressure within said lubricating fluid decreasing below said pressure within said gas when said pump means ceases operation, said gas expanding from said storage section and communicating with said pressurized section through said conduit,
   said gas expanding into said pressurized section through said conduit exerting a force on said lubricating fluid therewithin to move said fluid to said turbine.

2. The lubrication system of claim 1 further comprising a vent having an orifice therein disposed between said pressurized section and said nonpressurized section at a predetermined location within said pressurized section,
   said location of said vent being functionally related to said predetermined quantity of gas maintained within said gas storage section when said pump means is operable.

3. A lubrication system for providing lubricating fluid flow to a bearing for a turbine apparatus comprising:
   a lubricating fluid reservoir tank having a pressurized storage section and a nonpressurized collection section therein, said pressurized storage section, when operating, having said lubricating fluid disposed therein at a predetermined pressure and at a predetermined temperature,
   means for pumping said lubricating fluid from said storage section to said bearings,
   means for conducting lubricating fluid discharged from said bearing to said nonpressurized collection section,
   a cooler element disposed for lowering the temperature of said lubricating fluid to said predetermined temperature, said lubricating fluid passing from said collection chamber through said cooler element and into said pressurized storage section as said lubricating fluid is pumped to said bearings from said storage section, and,
   an emergency gas system for maintaining a flow of pressurized lubricating fluid to said bearings in the event of cessation of operation of said pumping means; said emergency gas system comprising:
   a source of high pressure gas, conduit means for connecting said source of high-pressure gas to said pressurized section of said reservoir, and control means cooperatively associated with said high-pressure gas source for introducing said high-pressure gas into said pressurized section of said reservoir tank, when the pressure of said lubricating fluid disposed therein drops lower than said predetermined pressure by a predetermined amount; said control means comprising:
   a valve device disposed within said conduit means, said valve device being responsive to said pressure of said pressurized fluid within said pressurized section of said reservoir, said valve device being closed to isolate said pressurized section of said reservoir from said high-pressure gas source, when said pressure within said pressurized fluid equals said predetermined value, said valve device opening to permit communication between said pressurized section and said high-pressure gas source, when said pressure within said pressurized fluid decreases below said predetermined value by said predetermined amount, said high pressure gas being introduced into said pressurized section of said reservoir by the opening of said valve exerting a force on said lubricating fluid therein to move said lubricating fluid to said bearing.

* * * * *